April 23, 1963
M. K. FINO
3,086,549
VENT FOR FUEL STORAGE TANKS
Filed Aug. 15, 1960
2 Sheets-Sheet 1
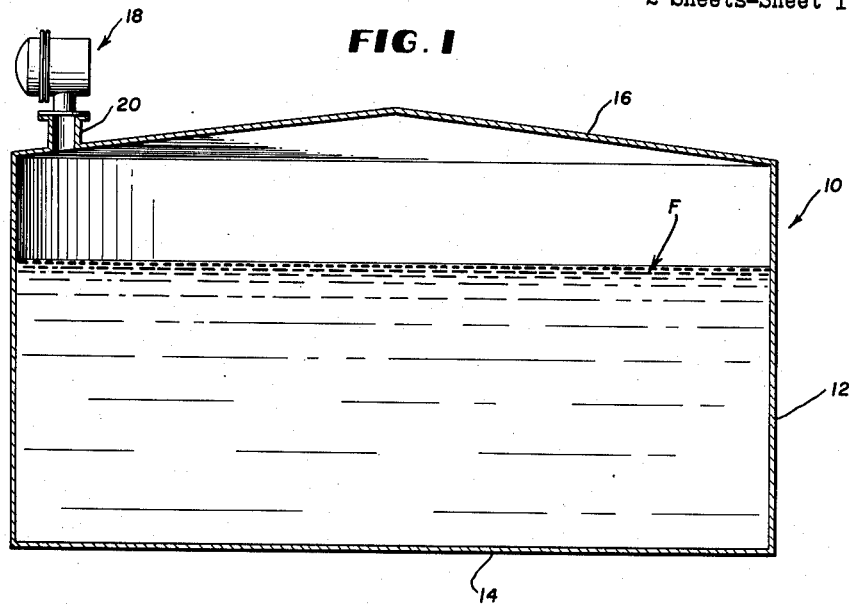
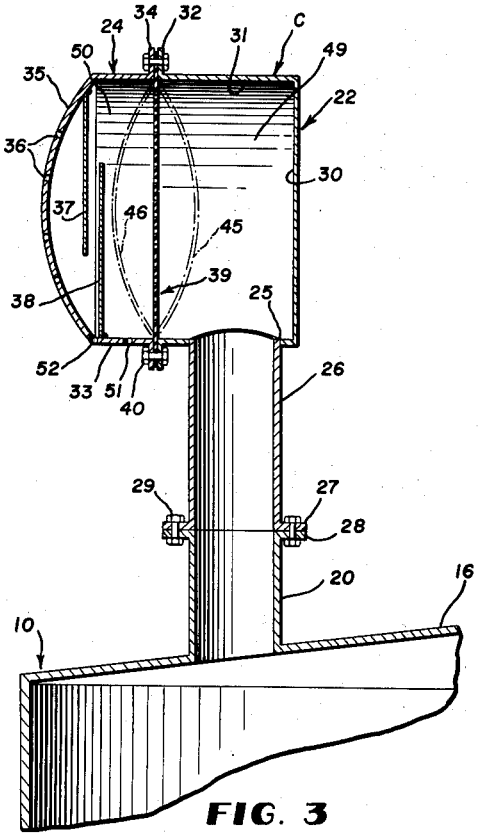
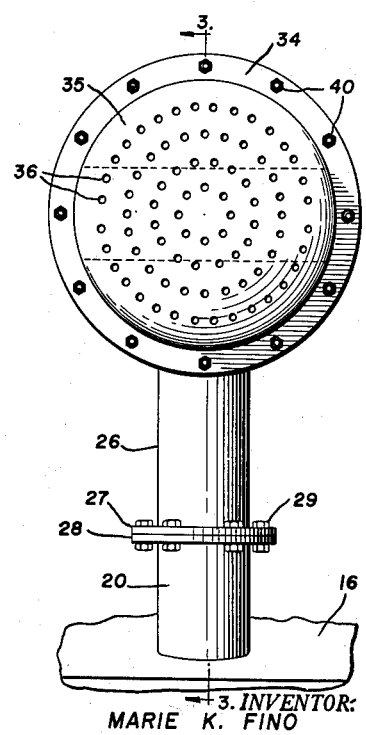
INVENTOR:
MARIE K. FINO
BY
Arthur Middleton
ATTORNEY April 23, 1963  M. K. FINO  3,086,549
VENT FOR FUEL STORAGE TANKS
Filed Aug. 15, 1960  2 Sheets-Sheet 2

INVENTOR:
MARIE K. FINO
BY
Arthur Middleton
ATTORNEY

# United States Patent Office 3,086,549
Patented Apr. 23, 1963

3,086,549
VENT FOR FUEL STORAGE TANKS
Marie K. Fino, 51 Hillside Drive, R.D., Warren, Pa.
Filed Aug. 15, 1960, Ser. No. 49,465
2 Claims. (Cl. 137—493)

This invention relates generally to venting devices and is directed particularly to improvements in storage tank vents.

Storage tanks or storage vessels of the type designed for volatile fluid are required to have connected therewith a suitable venting means whereby to relieve air or vapors from within when the product to be stored is pumped into the vessel and also to permit the entry of air when the stored product is withdrawn from the vessel.

Conventional venting devices as at present in use have certain drawbacks, among which are that they are costly to manufacture, ineffective for positive sealing, and in cold climates tend to freeze up with the result that tank failure frequently occurs. In many instances companies remove portions of the conventional structures which provide desired sealing action to prevent freezing danger and as a result large losses of the stored volatile liquid occurs.

In the light of the foregoing it is a particular object of the present invention to provide a new, novel and simply constructed venting device for storage tanks or storage vessels which will function efficiently to relieve interior pressure when such develops as, for example, when the tank or vessel is being filled and also to permit the entrance of air into the tank or vessel when the contained fluid is being withdrawn.

Another object of the invention is to provide a new and novel venting device as above described which is so designed that freeze up cannot occur and therefore the necessity for opening the vent or opening the tank to permit vapor losses during freezing weather is removed.

Venting devices for tanks or vessels designed for the storage of gasoline or other volatile fluids are required to be of a construction or design to permit slight pressure within the tank or vessel, such as pressure from one or two ounces for large vessels, to prevent rapid breathing losses due to temperature expansion and to avoid windage loss such as will occur as a result of air currents moving or blowing over the vent opening. For large field storage tanks or vessels such vents vary in size of from four to twelve inches in diameter and must be capable of emitting large volumes of vapor or air, otherwise the tank or vessel may fail due to excessive internal pressure or pressure reduction.

Another object of the present invention is accordingly to provide a new and novel type of venting device which is designed to permit or withstand a predetermined amount of vacuum imposed thereon or of pressure from within the vessel whereby breathing losses are reduced to a minimum and which device is also capable of emitting large volumes of vapor or air when required whereby failure of the tank or storage vessel will not occur.

Another feature associated with conventional vents such as are at present in use, which is not desirable, resides in the fact that the arrangement of such conventional vents requires that the vent be mounted absolutely horizontally. In such position the vents are equipped with a weather hood which deflects discharged vapors onto the tank roof. As a consequence of this, should the vented vapor be of an inflammatory nature and become ignited, the burning vapor will act as a blow torch on the metal roof of the tank which will result in the burning of the roof plates and therefore produce a major conflagration with complete loss of the tank and the product therein.

It is a further object, in view of the foregoing, to provide a new and novel venting device for tanks, particularly those containing highly inflammable volatile liquids, which may be mounted to discharge the vapors in a horizontal plane over the tank roof whereby the vapors are carried away from the tank roof and do not impinge on the steel thereof so that the hereinbefore described dangers which might result from ignition of the discharged vapor are completely avoided.

The foregoing and many other desirable objects are obtained by the provision of a casing which is divided into two chambers by means of a taut resilient or elastic diaphragm. The casing has connected with it and opening through a wall thereof a tubular member which is adapted to be secured to the tank or storage vessel in communication with the interior thereof and such tubular member opens into one of the chambers of the casing.

The other chamber of the casing has an apertured closure wall or weather cap and between this apertured closure wall or weather cap and the diaphragm there are positioned two overlapping but spaced apart weather deflectors. The normally taut diaphragm dividing the two chambers of the casing is provided with a multiplicity of normally closed slits or punctures which upon the development of a predetermined pressure increase or pressure reduction on one side of the diaphragm, or, in other words, upon the development of a suitable pressure differential in the two chambers which will cause the diaphragm to bulge in one direction, become opened so as to relieve pressure from within the tank or storage vessel or to permit air to enter the vessel to compensate for a reduced pressure therein.

Such diaphragm is designed as to weight and resiliency so as to withstand a predetermined amount of pressure without bulging and causing the slits or punctures to open and the casing is also provided on the weather side of the diaphragm or in a wall of the chamber on the weather side, with suitable drainage means for permitting the escape of any moisture which may develop in the chamber from condensation or which may succeed in entering the chamber through the perforated weather cap and past the weather deflectors.

Other objects and many attendant advantages of the present invention will become more apparent when considered in connection with the specification and accompanying drawings, wherein:

FIG. 1 illustrates a conventional storage tank or receptacle in section on a vertical diametrical plane and showing mounted upon the roof thereof a venting device constructed in accordance with the present invention.

FIG. 2 is a view in front elevation of one embodiment of the present invention.

FIG. 3 is a vertical section taken substantially on the line 3—3 of FIG. 2 and showing in broken lines within the casing the bowed positions to which the diaphragm may be deflected as a result of pressure differentials developed in the casing chambers.

FIG. 7 is a sectional view corresponding to FIG. 6 and illustrating the manner in which a slit or puncture opens under pressure or when the diaphragm is stretched.

Figure 8:
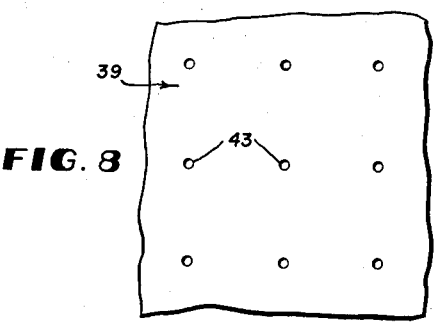

FIG. 8 illustrates a portion of a diaphragm showing another manner of forming punctures therein which punctures are normally tightly closed in an unstretched or relaxed condition of the diaphragm.

Referring now more particularly to the drawings, numeral 10 generally designates a tank structure which, it will be understood, is merely a conventional illustration for facilitating the showing and describing of the manner in which the vent device is connected therewith and without attempting to show any details of the tank construction other than the side wall 12, bottom 14 and top or roof 16.

The reference character F generally designates the fluid in the tank, the open area above which fluid would be normally filled with volatile vapors of the fluid.

The numeral 18 generally designates a venting device constructed in accordance with either of the two hereinafter described embodiments of the invention and which venting device is coupled for use with an upstanding or an upwardly directed nipple 20 carried by an opening through the roof 16 of the tank to the interior thereof and through the medium of which nipple vapors may pass into the venting device when required or air may flow through the venting device into the tank under the conditions hereinbefore described.

Figure 4:
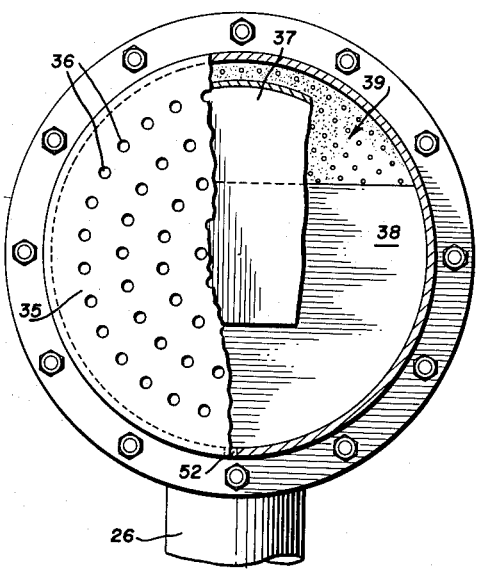
FIG. 4 is a front elevational view on an enlarged scale of the embodiment illustrated in FIGS. 2 and 3, with a portion of the weather cap broken away and with a portion of one internal weather deflector broken away and showing beyond the same the flexible or elastic diaphragm.

The venting device as illustrated in FIGS. 2, 3, and 4 comprises a casing generally designated C, which is here shown as being in the form of a cylinder divided in the two sections 22 and 24.

The side wall of the section 22 of the casing has an opening 25 therein in which is fitted an end of a tubular neck 26, the opposite end of which is shown flanged as at 27 to facilitate its attachment to the nipple 20 which latter element is shown with a surrounding top end flange 28 against which the flange 27 is fitted and the flanges are secured together by bolts 29 or in any other suitable manner.

While the top end of the neck portion 26 is here shown as fitted in the opening 25 this is merely to illustrate one suitable connection which may be employed and is not intended to limit the construction in any sense.

The casing section 22 has a back imperforate wall 30 and the side or surrounding wall 31 the free edge of which is defined by the encircling flange 32.

The section 24 of the casing is likewise defined by an encircling wall 33 corresponding in diameter with the wall 31 and having an end edge defined by a surrounding flange 34 adapted to co-act with the flange 32 for coupling the casing sections together.

The casing section 24 forms what may be defined as a weather cap and the forward end of the wall carries the outwardly bowed apertured wall 35, the apertures in which are designated 36.

Within the forward section 24 of the casing or within the weather cap there are provided the two overlapping but spaced apart weather deflector plates 37 and 38. One of these plates, here shown as the plate 37, is secured to the top portion of the wall 35 to depend therefrom through approximately two-thirds the height of the casing. The other deflector 38 is secured to the lowermost part of the wall 33 and extends upwardly through approximately two-thirds the height of the casing in overlapping relation with but spaced from the plate 37 as illustrated so that there is provided a free passageway for air or vapors to flow into or out of the casing through the apertures 36.

As shown the two sections 22 and 24 of the casing are secured together and the casing is divided by a relatively heavy flexible and resilient membrane or diaphragm generally designated 39, the periphery of which diaphragm is secured between the supporting flanges 32 and 34 where it is held by the bolts or other coupling elements 40 which pass through the flanges to secure the casing sections together.

This diaphragm or membrane 39 may be of a suitable material and of the necessary or suitable weight to function in the desired manner. Preferably such diaphragm or membrane may consist of synthetic rubber such as "Buna-N" of approximately 0.040" thickness reinforced by nylon or other suitable synthetic material. However, a thicker elastic material without internal reinforcement might be used if found practicable and the same breathing action obtained.

Figure 7:
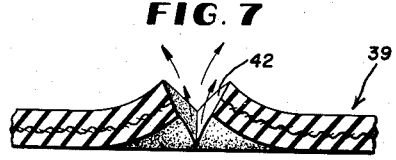
Figure 6:
FIG. 6 is a sectional detail on a greatly enlarged scale, taken substantially on the line 7—7 of FIG. 5 and illustrating the closed condition of the slit or puncture when the diaphragm is relaxed.
Figure 5:
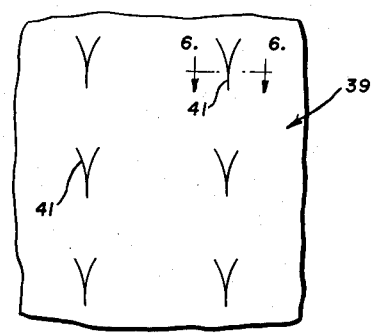
FIG. 5 illustrates on an enlarged scale a portion of a diaphragm showing one form of perforation or manner of cutting the diaphragm to provide relief openings when the diaphragm is stretching.

The membrane or diaphragm is provided with a multiplicity of normally closed perforations one form of which is illustrated in FIG. 5 where such perforations are designated 41 and are formed each by two convergent slits resembling one of the members of a tricuspid valve. These slits are normally tightly closed as illustrated in FIG. 6 in the relaxed condition of the diaphragm but upon stretching of the diaphragm the edges of the slit will be pulled apart thereby forming a relief opening 42 for the passage of vapors through the diaphragm as shown in FIG. 7.

It will be understood that the form of perforation in the diaphragm may vary as, for example, FIG. 8 illustrates a portion of the diaphragm 39 wherein the perforations are in the form of punctures 43 and while these punctures are shown as holes, it is to be understood that this would be the way in which they would appear when the diaphragm is stretched but in the normal or relaxed condition of the diaphragm they would be closed so that no vapor could pass through the diaphragm.

Also, as has been hereinbefore set forth, the weight of the diaphragm and its physical character would be selected so as to enable it to resist a certain amount of pressure before it would be bowed or stretched to the degree necessary to open the perforations.

Figure 9:
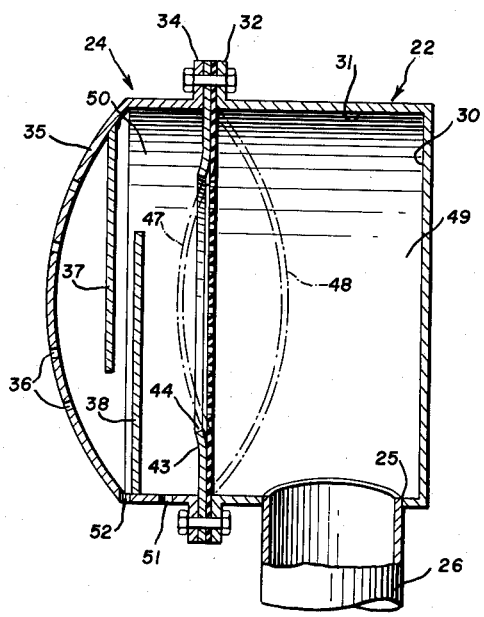

The conditions under which the diaphragm would yield to pressure to open the perforations may also be controlled or regulated by the structural arrangement illustrated in FIG. 9. In this figure it will be seen that the casing is of the same form as that illustrated in the preceding figures but that there is positioned over one side of the diaphragm a plate 43, the periphery of which is secured with the peripheral portion of the diaphragm between the flanges 32 and 34. This plate is provided with a central opening 44 which is of a diameter materially less than the inside diameter of the casing. As a result it will be seen that when the plate is located on the side of the diaphragm adjacent to the casing section 24 the pressure from within the tank will have to be considerably higher to blow the diaphragm to the extent necessary to open the apertures therein, than would be the pressure imposed on the diaphragm from the atmosphere.

In FIG. 3 the diaphragm is illustrated as bowed both inwardly and outwardly, the inward bowing being shown in broken lines designated 45 and the outward bowing being in broken lines designated 46. These illustrated bowings of the diaphragm represent the manner in which it would be affected respectively by a reduction of pressure within the tank or by an increase of pressure therein. Likewise in FIG. 9 the smaller outward bowing of the diaphragm shown in broken lines designated 47 would be created by relatively high pressure from within the tank, imposed on the diaphragm from within the chamber provided by the section 22 while the greater bowing of the diaphragm represented by the broken lines 48 represents the effect thereon by a reduced pressure in the tank, such bowing being a result of the tank pressure dropping below atmospheric pressure. Thus it will be seen that the diaphragm will be affected under changes in the relative pressures in the two chamber portions in the casing, the inner chamber portion being generally designated 49 and the outer chamber portion being designated 50.

From the foregoing it will be readily apparent that the numerous perforations in the diaphragm will remain sealed when the diaphragm is in its relaxed condition. By "relaxed condition" is meant the condition of the diaphragm when it is held taut across the casing. In this condition it will not be stretched but, on the other hand, it will not sag or be flabby but will present a straight wall as it is illustrated, until sufficient pressure is applied to one side or the other to cause it to overcome its natural tendency to resist stretching and thereby cause the apertures to be opened.

The principle involved in the present invention is such as to require only one valve element, which element is represented by the flexible diaphragm, for relieving pressure or for venting as required either under the effect of pressure or vacuum, in place of two separately acting elements or pallets as are used in conventional venting devices. The number of apertures in the diaphragm are of sufficient quantity to permit full discharge equal to the size of the opening connecting the assembly with the roof of the tank or with the interior of the tank.

Another desirable feature of the present venting device resides in the fact that if a condition should ever develop where excessive pressure or vacuum is formed beyond the venting capacity of the diaphragm the diaphragm may rupture and thereby provide immediate emergency relief and prevent damaging or failure of the tank. Replacement of the diaphragm may be easily, quickly and economically effected by simply removing the coupling elements 40 and inserting a new diaphragm.

The present venting device requires no machining, levelling or lubrication. Furthermore, the venting capacity and operating pressures can be controlled, regulated or adjusted by the insert baffle 43 shown in FIG. 9. Different values may be obtained on the pressure and vacuum sides by using baffle rings or plates such as the ring or plate 43, of different or unequal opening diameters.

In the event of moisture accumulating in the bottom of the outer chamber 50 as a result of moisture condensation on the outer side of the diaphragm, such moisture may be readily drained off through a drain aperture 51 located between the weather deflector or plate 38 and the diaphragm and a similar drainage opening may be provided at 52 to permit the escape of any moisture which may accumulate in the lower part of the weather cap on the outer side of the deflector 38. Thus the possibility of fluid accumulating in the vent and freezing and thereby causing difficulty in winter weather will be avoided.

From the foregoing it will be seen that there is provided by the present invention a new and novel venting device for tanks and receptacles containing volatile fluids which is of relatively simple construction so that it may be economically produced and which, at the same time, will function efficiently for accomplishing the desired results.

As this invention may be embodied in several forms without departing from the spirit or essential characteristics thereof, the present embodiment is therefore illustrative and not restrictive, since the scope of the invention is defined in the appended claims, and all changes that fall within the metes and bounds of the claims, or that form their functional as well as conjointly cooperative equivalents, are therefore intended to be embraced by those claims.

I claim:

1. A relief valve comprising a casing divided into a first half and a second half, said first half having a back wall and continuous side walls joined thereto, the side walls terminating in an encircling outwardly projecting flange, said second half having a forward wall and continuous side walls joined thereto, the side walls of the second half terminating in an encircling outwardly projecting flange, said flanges being in opposing relationship, a normally flat diaphragm of relatively thin elastic material interposed between said first and second halves of the casing and having a peripheral portion tightly secured between said flanges and dividing the casing into a first and a second chamber, the diaphragm having perforations therethrough which are closed when the diaphragm is in the said normally flat and unstretched condition, a tubular body joined at one end to a side wall of said first half and opening into said first chamber, said front wall of said second chamber being perforated, two relatively closely spaced overlapping plates located in the said second half of the casing between the front wall of said second chamber and said diaphragm, said side wall of the second half having a drain opening therein, and said diaphragm perforations being opened to pass fluid upon stretching and bowing of the diaphragm into either of said chambers resulting from unequal fluid pressures in the two chambers.

2. The invention according to claim 1, with means for controlling the bowing of the diaphragm in one direction by pressure higher in one chamber than in the other, comprising a plate secured in the casing around its periphery between the periphery of the diaphragm and the outwardly projecting flange of one casing half, said plate lying against a side of the diaphragm and having an opening defining an area smaller than the area of said side of the diaphragm.

References Cited in the file of this patent

UNITED STATES PATENTS

| | | |
|---|---|---|
| 967,895 | Frederick | Aug. 23, 1910 |
| 1,856,492 | Marshall | May 3, 1932 |
| 2,166,730 | Schanck | July 18, 1939 |
| 2,189,084 | Schanck | Feb. 6, 1940 |
| 2,875,776 | Skipwith | Mar. 3, 1959 |
| 2,941,544 | Peras | June 21, 1960 |